United States Patent
Jurk (10) Patent No.: US 11,425,146 B2
(45) Date of Patent: Aug. 23, 2022

(54) SYSTEM AND METHOD FOR THE SECURE AND EFFICIENT PROVISION OF AT LEAST PARTLY AUTOMATED DRIVING MODES

(71) Applicant: Bayerische Motoren Werke Aktiengesellschaft, Munich (DE)

(72) Inventor: Reinhard Jurk, Groebenzell (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/545,108

(22) Filed: Aug. 20, 2019

(65) Prior Publication Data

US 2019/0380035 A1 Dec. 12, 2019

Related U.S. Application Data

(63) Continuation of application No. PCT/EP2018/052777, filed on Feb. 5, 2018.

(30) Foreign Application Priority Data

Feb. 24, 2017 (DE) .................... 10 2017 203 022.4

(51) Int. Cl.
*H04L 9/40* (2022.01)
*G06F 21/30* (2013.01)

(52) U.S. Cl.
CPC .......... *H04L 63/123* (2013.01); *G06F 21/305* (2013.01)

(58) Field of Classification Search
CPC ..... H04W 12/08; B60W 50/02; H04L 63/123; G06F 21/305
See application file for complete search history.

(56) References Cited

U.S. PATENT DOCUMENTS 8,521,352 B1    8/2013  Ferguson et al.
8,688,306 B1 *  4/2014  Nemec .................... B60T 17/18
                                                    701/25

(Continued)

FOREIGN PATENT DOCUMENTS

CN    101461271 A    6/2009
CN    102233877 A    11/2011

(Continued)

OTHER PUBLICATIONS

Ki Tae Kim • Jin Woo Kim • Wooyong Han; The user interface based on Electromyography analysis to takeover Driving mode in autonomous vehicle; 2016 IEEE Transportation Electrification Conference and Expo, Asia-Pacific (ITEC Asia-Pacific) (pp. 697-701); (Year: 2016).*

(Continued)

*Primary Examiner* — Luu T Pham
*Assistant Examiner* — Chao Wang
(74) *Attorney, Agent, or Firm* — Crowell & Moring LLP (57) ABSTRACT

A method and system for secure and efficient provision of at least one at least partly automated driving mode of a vehicle. The method includes creating a request by the vehicle to retrieve an authorization of a performance of the at least one at least partly automated driving mode; receiving the request at a server; checking the authorization of the performance of the at least one at least partly autonomous driving mode; creating authorization data corresponding to the check; creating a response including the authorization data and further useful data; and receiving and evaluating the response in the vehicle.

17 Claims, 3 Drawing Sheets

(56) References Cited

U.S. PATENT DOCUMENTS

| | | |
|---|---|---|
| 2007/0149184 A1 | 6/2007 | Viegers et al. |
| 2011/0241862 A1 | 10/2011 | Debouk et al. |
| 2013/0338877 A1 | 12/2013 | Strausss |
| 2014/0156133 A1 | 6/2014 | Cullinane et al. |
| 2015/0149018 A1 | 5/2015 | Attard et al. |
| 2015/0149023 A1 | 5/2015 | Attard et al. |
| 2015/0217763 A1* | 8/2015 | Reichel .................. G01S 19/13 701/23 |
| 2015/0286219 A1 | 10/2015 | Reichel et al. |
| 2016/0207538 A1 | 7/2016 | Urano et al. |
| 2016/0229414 A1* | 8/2016 | Desnoyer .......... B60W 50/0097 |
| 2017/0026492 A1* | 1/2017 | Kawamura ........... H04L 67/322 |
| 2017/0219364 A1* | 8/2017 | Lathrop ................. G01C 21/36 |
| 2018/0053422 A1 | 2/2018 | Altinger et al. |
| 2018/0174451 A1* | 6/2018 | Rao .................... G01C 21/3461 |
| 2018/0314252 A1 | 11/2018 | Asakura et al. |
| 2020/0059942 A1* | 2/2020 | Itoh ................... H04W 72/1221 |

FOREIGN PATENT DOCUMENTS

| | | | |
|---|---|---|---|
| CN | 103477377 A | 12/2013 | |
| CN | 104616516 A | 5/2015 | |
| CN | 104837705 A | 8/2015 | |
| CN | 105303890 A | 2/2016 | |
| CN | 105807764 A | 7/2016 | |
| DE | 10 2012 021 282 A1 | 4/2014 | |
| DE | 10 2014 013 672 A1 | 4/2015 | |
| DE | 102014013672 A1 * | 4/2015 | ....... G08G 1/096775 |
| DE | 10 2014 223 258 A1 | 5/2015 | |
| DE | 10 2014 223 269 A1 | 5/2015 | |
| DE | 10 2015 002 405 A1 | 8/2016 | |
| EP | 2 858 039 A1 | 4/2015 | |
| EP | 2858039 A1 * | 4/2015 | ............ G08G 1/097 |
| WO | WO 2017/006651 A1 | 1/2017 | |

OTHER PUBLICATIONS

Yongbon Koo • Jinwoo Kim • Wooyong Han; A method for driving control authority transition for cooperative autonomous vehicle; 2015 IEEE Intelligent Vehicles Symposium (IV) (pp. 394-399); (Year: 2015).*

Duy Tran • Eyosiyas Tadesse • Weihua Sheng • Yuge Sun • Meiqin Liu • Senlin Zhang; A driver assistance framework based on driver drowsiness detection; 2016 IEEE International Conference on Cyber Technology in Automation, Control, and Intelligent Systems (Cyber) (pp. 173-178); (Year: 2016).*

International Search Report (PCT/ISA/210) issued in PCT Application No. PCT/EP2018/052777 dated May 22, 2018 with English translation (seven (7) pages).

German-language Written Opinion (PCT/ISA/237) issued in PCT Application No. PCT/EP2018/052777 dated May 22, 2018 (seven (7) pages).

German-language Search Report issued in counterpart German Application No. 10 2017 203 022.4 dated Dec. 6, 2017 with partial English translation (17 pages).

Chinese-language Office Action issued in Chinese Application No. 201880013537.8 dated May 20, 2021 with English translation (20 pages).

Chinese-language Office Action issued in Chinese Application No. 201880013537.8 dated Nov. 22, 2021 with English translation (17 pages).

* cited by examiner

SYSTEM AND METHOD FOR THE SECURE AND EFFICIENT PROVISION OF AT LEAST PARTLY AUTOMATED DRIVING MODES

CROSS REFERENCE TO RELATED APPLICATIONS

This application is a continuation of PCT International Application No. PCT/EP2018/052777, filed Feb. 5, 2018, which claims priority under 35 U.S.C. § 119 from German Patent Application No. DE 10 2017 203 022.4, filed Feb. 24, 2017, the entire disclosures of which are herein expressly incorporated by reference.

BACKGROUND AND SUMMARY OF THE INVENTION

The present invention relates to a system and method for the secure and efficient provision of at least partly autonomous driving modes for vehicles.

Vehicles that support at least partly autonomous driving modes are known. They may have a multiplicity of sensors that are necessary to execute at least partly autonomous driving modes. The sensors include object recognition systems such as for example cameras, distance measurement systems, etc. that continuously gather data during driving operation. These data may then accordingly be aggregated in the vehicle and outside of the vehicle (what is known as a "backend", also "server" hereinafter) so as to be able to provide the functionality of a corresponding (partly) autonomous driving mode or to take over control of the vehicle or to make the information available to other vehicles so that these are able to execute corresponding (partly) autonomous driving functions. Further data from a digital road map for providing the corresponding (partly) autonomous driving mode may be processed to form the data that are recorded by the sensors. These data may be supplemented by current data regarding the current situations in the road traffic (for example congestion, accidents) and/or current environmental influences (for example ice), which are provided for example by a server. One disadvantage in this case is that, in the case of a large number of vehicles having a (partly) autonomous driving mode in the road traffic, the data quantity that has to be transmitted through the air interface—generally via the mobile radio network—to these vehicles may become very large and may thus exceed the capacities of the mobile radio network or incur high data transmission costs. Furthermore, when providing at least one (partly) autonomous driving mode, it is not taken into account that the (partly) autonomous driving mode may be erroneous, for example due to a technical defect or due to a malfunction in the IT security functions of the vehicle (for example hacker attack), and may therefore constitute a hazard for the driver and other traffic participants.

The object of the invention is to avoid the abovementioned disadvantages and to provide a solution that allows secure and, at the same time, efficient provision of at least partly autonomous driving modes for vehicles.

According to a first aspect of the invention, a method for the secure and efficient provision of at least one at least partly autonomous driving mode of a vehicle is provided, comprising:

creation of a request by the vehicle to retrieve an authorization to perform the at least one at least partly autonomous driving mode;

reception of the request at a server;

checking of the authorization to perform the at least one at least partly autonomous driving mode;

creation of authorization data corresponding to the check; and creation of a response comprising the authorization data; and reception and evaluation of the response in the vehicle.

The vehicle or motor vehicle may for example comprise a control unit that is configured so as to move the vehicle in a partly or fully autonomous driving mode without or with only limited intervention by the driver of the vehicle. By way of example, the control unit may be configured so as to autonomously move the vehicle from a start point of a (partial) driving route to the end point of a (partial) driving route. The control unit (or any other appropriate control unit in the vehicle that is connected in terms of communication to the control unit in order to move the vehicle) may be designed to create a request to retrieve an authorization to perform the at least one at least partly autonomous driving mode (called autonomous driving mode below for the sake of simplification) and transmit it to a server or backend server for example via a mobile radio system. For the sake of clarity, the present method is explained only with reference to a server, but it may in this case however also involve any desired combination of servers and/or further appropriate modules. In a partly autonomous driving mode, this may be limited to particular routes and/or road categories depending on the situation, for example one partly autonomous driving mode may be limited to journeys on the freeway, another to journeys in a city, etc.

The request may comprise accordingly appropriate data, such as for example an identification (ID) of the vehicle, a position of the vehicle, etc. After the addressed server receives the request, it is able to extract the data from the request and process them. In particular, in the processing, an authorization of the vehicle to execute the autonomous driving mode is checked. By way of example, the server is able to check, by retrieving data stored in a storage unit and/or by requesting corresponding data from another server, whether:

(i) there is a security problem in relation to the vehicle, such as for example compromising of one or more controllers by a previous hacker attack and/or a weakness in the system design that has become known;

(ii) the vehicle is authorized by type for the intended autonomous driving mode; and/or (iii) the vehicle is individually authorized for the intended autonomous driving mode. Authorization may for example be necessary in the case of a usage-dependent product offer comprising one or more (partly) autonomous driving functions for a predetermined time interval.

On the basis of the processing or checking by the server, the server is able to create corresponding authorization data and generate a response to the vehicle that comprises the authorization data. The response is transmitted to the vehicle via the mobile radio system or mobile radio network and processed accordingly (for example by the abovementioned control unit).

The authorization data preferably comprise an authorization confirmation or an authorization denial, wherein the evaluation of the response in the vehicle comprises:

(i) if the authorization data comprise an authorization confirmation: executing or continuing the at least one at least partly autonomous driving mode in the vehicle; and (ii) if the authorization data comprise an authorization denial: denying or interrupting the at least one at least partly autonomous driving mode in the vehicle.

In relation to the abovementioned example, the authorization data may comprise an authorization confirmation if it has been established that (i) there is no security problem in relation to the vehicle; and/or (ii) the vehicle is authorized by type for the intended autonomous driving mode; and/or (iii) the vehicle is individually authorized for the intended autonomous driving mode.

If there is a security problem and/or the vehicle is not (by type or individually) authorized for the intended driving mode, the authorization data comprise an authorization denial.

If the authorization data of the response comprise an authorization confirmation, the autonomous driving mode is able to be executed or continued (for example by the abovementioned control unit) (depending on whether the autonomous driving mode is already being executed). If the authorization data by contrast comprise an authorization denial, the autonomous driving mode may be denied or interrupted (depending on whether the autonomous driving mode is already being executed).

The method preferably additionally comprises the following steps:

calculation, by the server, of a payload data quantity for payload data of the response, wherein the payload data quantity is the difference between the overall payload data and the authorization data of the response;

requesting payload data for the response, wherein the requested payload data correspond to the calculated payload data quantity;

wherein the response to the authorization data contains the requested payload data; and wherein the evaluation of the response in the vehicle additionally comprises the evaluation of the payload data.

The request may be a data block having a predefined length or size M that comprises the required data for the authorization request, wherein the rest of the data block may be filled with what are known as dummy bits (what is known as padding). The use of data blocks having a predefinable length is conventional in the data transmission of current mobile radio systems (what is known as block rounding). Accordingly, the server is then able to calculate what payload data quantity is available for the data block corresponding to the response. In particular, the payload data quantity is the difference of the data quantity available overall for the response in the data block minus the data quantity that corresponds to the authorization data. Depending on the calculated payload data quantity, the server is then able to retrieve payload data from a database and/or retrieve them from other servers.

When the response is created by the server, the corresponding data block in relation to the authorization data may contain the requested payload data. If the payload data to be transmitted to the vehicle exceed the calculated payload data quantity, a session may be established by the server and it may at the same time be noted that not all of the payload data were able to be transmitted using the current response. In this case, the remaining payload data are sent using one or more subsequent responses.

The payload data preferably comprise one or more of the following data:

(i) data in relation to an update of a digital road map contained in the vehicle;

(ii) data in relation to current situations in the road traffic;

(iii) data in relation to current environmental influences; and/or (iv) further appropriate data.

The request is preferably created upon predefinable events, such as for example at regular time intervals (for example every minute) or geometric intervals (for example every 1 km).

In order to ensure driving safety when performing the autonomous driving mode, the creation of the authorization request by the vehicle may take place upon predefined or predefinable events. By way of example:

(i) before each manual activation of the autonomous driving mode by the driver;

(ii) before each automatic activation of the autonomous driving mode by a corresponding controller;

(iii) at regular time intervals (for example every minute) and/or geometric intervals (for example every 1 km), the intervals being able to vary depending on the situation (for example journey on the freeway vs. journey in the city); and/or (iv) at any other appropriate time.

Preferably, if it is not possible for the vehicle to create the request upon the predefinable or predefined events, the at least one at least partly autonomous driving mode is executed or continued in the vehicle for a predetermined time interval and/or location interval depending on the situation.

It may be the case, for example due to lack of availability of the mobile radio network (for example a tunnel, overloaded mobile radio network), that the vehicle is not able to create the request at the necessary or correct time. In this case, the autonomous driving mode (if applicable: depending on the situation, for example if the executed partly autonomous driving mode is limited to freeway journeys/inner city journeys and the journey is continued on the freeway) may be executed or continued for a predetermined time interval (for example 1 minute (min), 2 min, 5 min, etc.) and/or location interval (for example every 1 kilometer (km), every 2 km, every 5 km, etc.) (depending on whether the autonomous driving mode is already being executed). In this case, the predetermined time interval and/or location interval of the continuation may be parameterized depending on the situation. By way of example, the predetermined time interval and/or location interval may be selected so as to be longer in the case of freeway journeys, and selected so as to be shorter in the case of inner city journeys, for example as it is assumed that there is less risk of a vehicle that is actually no longer authorized on freeways.

According to a second aspect of the present invention, the underlying object is achieved by a system for the secure and efficient provision of at least one at least partly autonomous driving mode of a vehicle, comprising:

at least one server for:
  receiving a request, created by the vehicle, to retrieve an authorization for the vehicle to perform the at least one at least partly autonomous driving mode;
  checking the authorization to perform the at least one at least partly autonomous driving mode of the vehicle;
  creating authorization data corresponding to the check; and
  creating a response comprising the authorization data;
at least one vehicle for receiving and evaluating the response.

The authorization data preferably comprise an authorization confirmation or an authorization denial, wherein the evaluation of the response comprises:

(i) if the authorization data comprise an authorization confirmation: executing or continuing the at least one at least partly autonomous driving mode in the vehicle; and (ii) if the authorization data comprise an authorization denial: denying or interrupting the at least one at least partly autonomous driving mode in the vehicle.

The creation of the response by the server preferably additionally comprises:

calculation of a payload data quantity for payload data of the response, wherein the payload data quantity is the difference between the overall payload data and the authorization data of the response;

requesting payload data for the response, wherein the requested payload data correspond to the calculated payload data quantity;

wherein the response to the authorization data contains the requested payload data; and wherein the evaluation of the response in the vehicle additionally comprises the evaluation of the payload data.

The payload data preferably comprise one or more of the following data:

(i) data in relation to an update of a digital road map contained in the vehicle;

(ii) data in relation to current situations in the road traffic;

(iii) data in relation to current environmental influences.

The vehicle preferably creates the request upon predefined events, wherein, if it is not possible for the vehicle to create the request upon the predefined events, the at least one at least partly autonomous driving mode is executed or continued in the vehicle for a predetermined time interval and/or location interval depending on the situation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
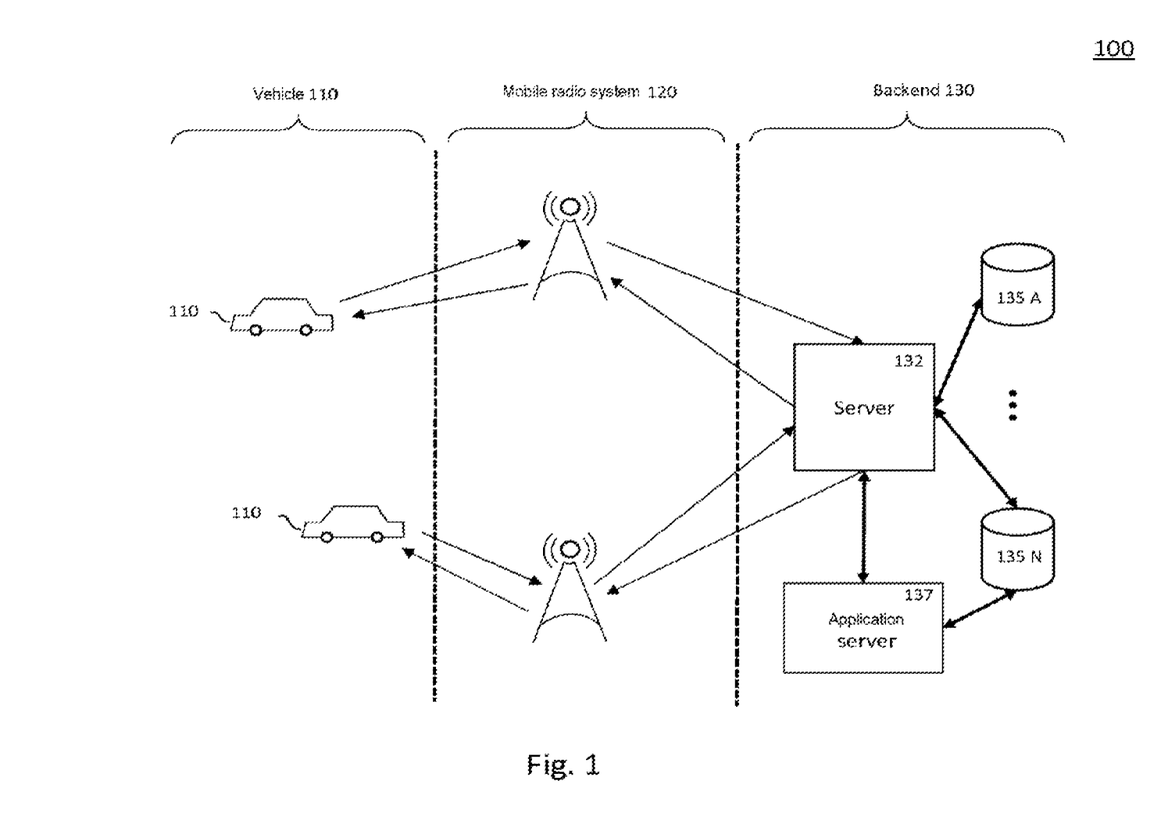
FIG. 1 shows an exemplary system for the secure and efficient provision of at least one at least partly autonomous driving mode of a vehicle.

FIG. 1 shows an exemplary system 100 for the secure and efficient provision of at least one at least partly autonomous driving mode of a vehicle 110 or motor vehicle 110. The vehicle 110 may for example comprise a control unit (not shown) that is configured so as to move the vehicle 110 in a partly or fully autonomous driving mode without or with only limited intervention by the driver of the vehicle 110. By way of example, the control unit may be configured so as to autonomously move the vehicle 110 from a start point of a (partial) driving route to the end point of the (partial) driving route. The control unit (or any other appropriate control unit in the vehicle 110 that is connected in terms of communication to the control unit in order to move the vehicle) may be designed to create a request 210 (see FIG. 2) to retrieve an authorization to perform the at least one at least partly autonomous driving mode (called autonomous driving mode below for the sake of simplification) and transmit it for example via a mobile radio system or mobile radio network 120. The communication between the vehicle 110 and the server 132 in the backend 130 may be performed in order to further increase the security by way of a public key infrastructure (PKI, not shown) for checking the trustworthiness of the server 132 and/or of the vehicle 110 comprising a trusted third party TTP.

The vehicle 110 may create the request 210 (as explained further below with reference to FIG. 2) to retrieve an authorization to perform the at least one at least partly autonomous driving mode. The vehicle 110 may create the request 210 upon predefinable or predefined events. In order to ensure driving safety when performing the autonomous driving mode of the vehicle 110, the creation of the (authorization) request 210 by the vehicle 110 may take place for example (and may thus for example comprise the predefined or predefinable event):

(i) before each manual activation of the autonomous driving mode by the driver;

(ii) before each automatic activation of the autonomous driving mode by a corresponding controller (for example after driving onto a freeway in order to initiate an autonomous driving mode on the freeway);

(iii) at regular time intervals $t_0, t_1, \ldots, t_N$ (cf. FIG. 2); and/or (iv) at any other appropriate time.

It may in this case be defined that, if it is not possible for the vehicle 110 to create the request 210 upon the predefinable or predefined events, the at least one at least partly autonomous driving mode is executed or continued in the vehicle 110 for a predetermined time interval and/or location interval depending on the situation. It may be the case, for example due to lack of availability of the mobile radio network (for example a tunnel, network overload), that the vehicle 110 is not able to create the request 210 at the necessary or correct time. In this case, the autonomous driving mode (if applicable: depending on the situation, for example if the executed partly autonomous driving mode is limited to freeway journeys/inner city journeys and the journey is continued on the freeway) may be executed or continued for a predetermined time interval (for example 1 minute (min), 2 min, 5 min, etc.) and/or location interval (for example every 1 kilometer (km), every 2 km, every 5 km, etc.) (depending on whether the autonomous driving mode is already being executed). In this case, the predetermined time interval and/or location interval of the continuation may be parameterized depending on the situation. By way of example, the predetermined time interval and/or location interval may be selected so as to be longer in the case of freeway journeys, and selected so as to be shorter in the case of inner city journeys, for example as it is assumed that there is less risk of a vehicle that is actually no longer authorized on freeways.

Figure 2:
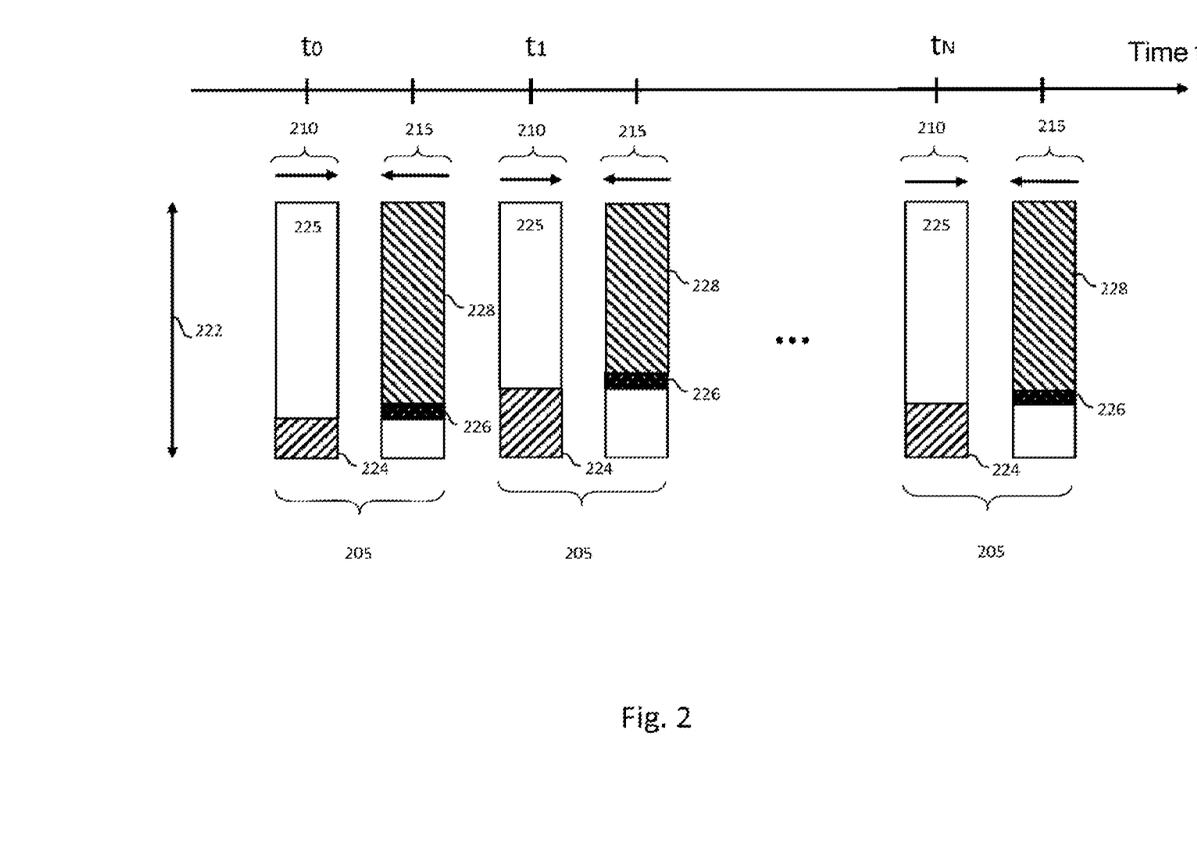
FIG. 2 shows exemplary request response pairs that are exchanged between the vehicle and the server via the mobile radio network.

The request or authorization request 210 may accordingly comprise appropriate data 224, such as for example an identification (ID) of the vehicle 110, a position of the vehicle 110, etc. The request 210 may be a data block having a predefined length or size M 222 that comprises the appropriate or required data for the authorization request 224 (for example ID of the vehicle 110, position of the vehicle 110). The use of data blocks having a predefinable or predefined length M 222 is conventional in the data transmission of current mobile radio systems 120 (what is known as block rounding).

After the addressed server 132 has received the request 210 via the mobile radio system or mobile radio network 120, the server 132 is able to extract the appropriate data 224 (for example ID of the vehicle 110, position of the vehicle 110) from the request data block 210 and process them. In particular, in the processing of the request or request data block 210, the authorization of the vehicle 110 to execute the autonomous driving mode is checked. By way of example, the server 132 is able to check, by retrieving data stored in a storage unit 135A ... 135N and/or by requesting corresponding data from one or more further application servers 137, whether:

(i) there is a security problem in relation to the vehicle 110;

(ii) the vehicle 110 is authorized by type for the intended autonomous driving mode; and/or (iii) the vehicle 110 is individually authorized for the intended autonomous driving mode.

These data may be stored, for example for all of the vehicles that have at least one at least partly autonomous driving mode, in one or more databases 135A ... 135N, for example in accordance with an appropriate registration process using one or more accordingly appropriate registration servers (not shown).

After checking the authorization of the vehicle 110 to execute the autonomous driving mode, the server 132 may create authorization data 226 for the response or the response data block 215. The authorization data 226 may comprise an authorization confirmation or an authorization denial. By way of example the authorization data 226 may comprise an authorization confirmation if it has been established that:

(i) there is no security problem in relation to the vehicle 110; and/or (ii) the vehicle 110 is authorized by type for the intended autonomous driving mode; and/or (iii) the vehicle is individually authorized for the intended autonomous driving mode.

If there is a security problem and/or the vehicle 110 is not (by type or individually) authorized for the intended driving mode, the authorization data 226 comprise an authorization denial.

The processing of the request 210 by the server 132 may also comprise calculation of a payload data quantity for payload data 228 of the response data block 215. This payload data quantity may be the difference between the overall payload data (226+228) and the authorization data 226 of the response 215. The server 132 may then request payload data 228 for the response or the response data block 215 from one or more storage units (135A, ..., 135N) or further application servers 137, wherein the requested payload data 228 correspond to the calculated payload data quantity. The payload data 228 may for example be one or more of the following data or data types:

(i) data in relation to an update of a digital road map contained in the vehicle 110 (for example new construction sites, new road layout, etc.);

(ii) data in relation to current situations in the road traffic (for example current traffic state, current accidents, current road closures, etc.);

(iii) data in relation to current environmental influences (for example black ice, strong gusts of wind, etc.); and/or (iv) further appropriate data.

When the response or the response data block 215 is created by the server 132, the corresponding data block 215 in relation to the authorization data 226 may comprise the requested payload data 228. If the payload data 228 to be transmitted exceed the calculated payload data quantity, a session may be established by the server and it may at the same time be noted that not all of the payload data 218 were able to be transmitted using the current response 215. In this case, the remaining payload data are sent using one or more subsequent responses 215.

The response or the response data block 215 is then transmitted to the vehicle 110 via the mobile radio network or mobile radio system 120. The vehicle 110 receives the response 215 and evaluates it accordingly. If the authorization data 226 of the response 215 comprise an authorization confirmation, the autonomous driving mode may be executed or continued (for example by the abovementioned control unit), depending on whether the autonomous driving mode is already being executed. If the authorization data 226 by contrast comprise an authorization denial, the autonomous driving mode may be denied or interrupted depending on whether the autonomous driving mode is already being executed. If payload data 228 are also received with the response 215, these payload data may accordingly be processed in order to execute the autonomous driving mode (for example update the digital map: update current situations in the road traffic and/or update current environmental influences, etc.).

FIG. 2 shows exemplary request response pairs 205 that are exchanged between the vehicle 210 and the server 312 via the mobile radio network or mobile radio system 120 in a system as described with reference to FIG. 1 and in a method as described with reference to FIG. 3. In this example, a request is made periodically at the time $t_0$, $t_1$, ..., $t_N$. Each request 210 and each response 215 comprise data blocks having a predefined data block length or data block size M 222. Each request 210 or authorization request 210 may accordingly comprise appropriate data for the authorization 224, such as for example an identification (ID) of the vehicle 110, a position of the vehicle 110, etc. The data for the authorization 224 fill only part of the request block 210 having the predefined data size M 222.

As described with reference to FIGS. 1 and 3, the processing of the request 210 by the server 132 may comprise calculating a payload data quantity for payload data 228 of the response data block 215 (step 340). The payload data quantity corresponds to the data quantity M 222 minus the data for the authorization 224. In other words, the payload data quantity corresponds to the difference between the overall payload data (226+228) of the response 215 and the authorization data 226 of the response 215. Each response 215 may then comprise the authorization data 226 and further payload data 228 (cf. FIGS. 1 and 3). If the payload data 228 to be transmitted exceed the calculated payload data quantity, a session may be established by the server and it may at the same time be noted that not all of the payload data 218 were able to be transmitted using the current response 215. In this case, the remaining payload data are sent using one or more subsequent responses 215 (for example by buffer-storing these data in a storage unit in the server 132).

Figure 3:
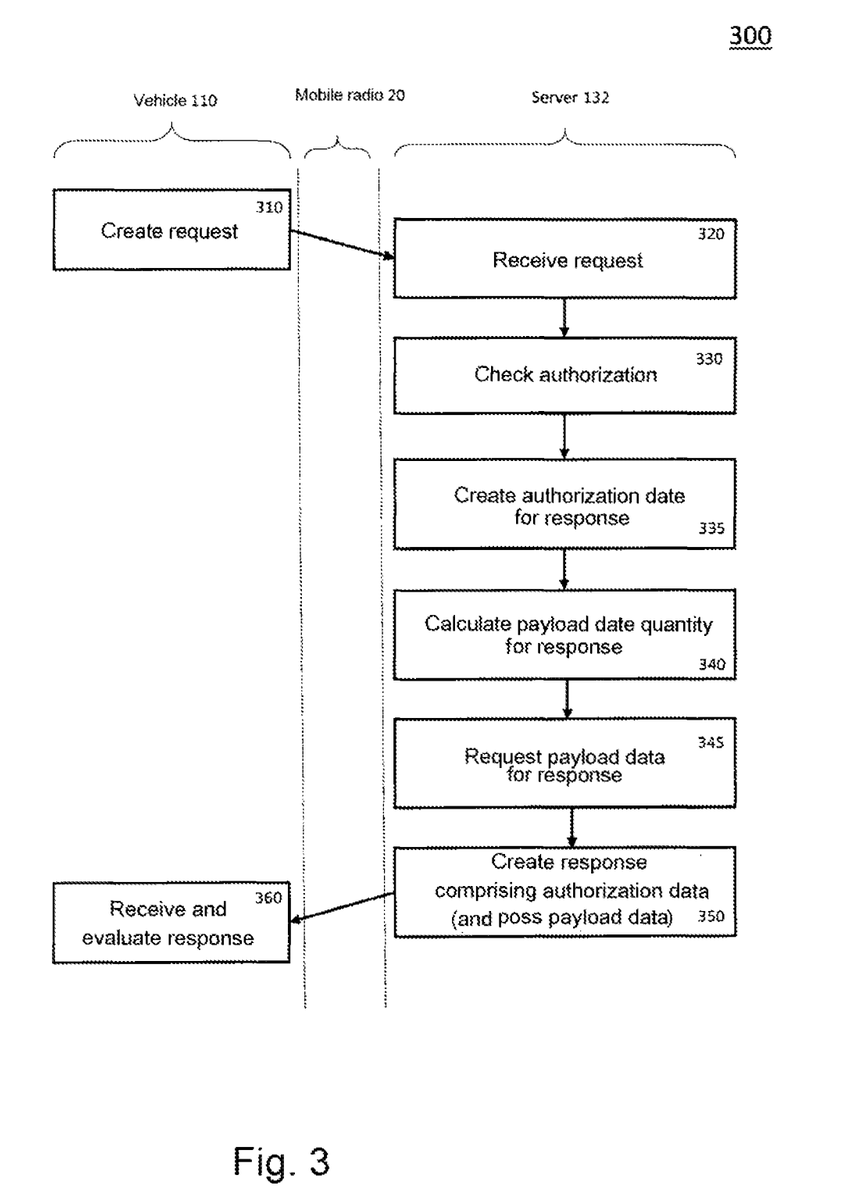
FIG. 3 shows an exemplary method for the secure and efficient provision of at least one at least partly autonomous driving mode of a vehicle.

FIG. 3 shows an exemplary method 300 for the secure and efficient provision of at least one at least partly autonomous driving mode of a vehicle 110 or motor vehicle 110. The vehicle 110 may for example comprise a control unit that is configured so as to move the vehicle 110 in a partly or fully autonomous driving mode without or with only limited intervention by the driver of the vehicle. By way of example, the control unit may be configured so as to autonomously move the vehicle 110 from a start point of a (partial) driving route to the end point of the (partial) driving route. The control unit (or any other appropriate control unit in the vehicle 110 that is connected in terms of communication to the control unit in order to move the vehicle) may be designed to create a request to retrieve an authorization to perform the at least one at least partly autonomous driving mode (called autonomous driving mode below for the sake of simplification) (step 310) and transmit it for example via a mobile radio system or mobile radio network 120 to a backend server or server 132. The communication between the vehicle 110 and the server 132 in the backend 130 may be performed for example by way of a public key infrastructure (PKI) in order to check the trustworthiness of the server 132 and/or of the vehicle 110 comprising a trusted third party TTP.

The vehicle 110 may create a request 210 (as explained further above with reference to FIG. 2) to retrieve an authorization to perform the at least one at least partly autonomous driving mode. The vehicle 110 may create the request 210 upon predefinable or predefined events and thus start the method 300. In order to ensure driving safety when performing the autonomous driving mode of the vehicle 110, the creation of the (authorization) request 210 by the vehicle 110 may take place for example:

(i) before each manual activation of the autonomous driving mode by the driver;

(ii) before each automatic activation of the autonomous driving mode by a corresponding controller (for example after driving onto a freeway in order to initiate an autonomous driving mode on the freeway);

(iii) at regular time intervals $t_0, t_1, \ldots, t_N$ (cf. FIG. 2); and/or (iv) at any other appropriate time.

It may in this case be defined that, if it is not possible for the vehicle 110 to create the request 210 upon the predefinable or predefined events, the at least one at least partly autonomous driving mode is executed or continued in the vehicle 110 for a predetermined time interval and/or location interval depending on the situation. It may be the case, for example due to lack of availability of the mobile radio network (for example a tunnel, network overload), that the vehicle 110 is not able to create the request 210 at the necessary or correct time. In this case, the autonomous driving mode (if applicable: depending on the situation, for example if the executed partly autonomous driving mode is limited to freeway journeys/inner city journeys and the journey is continued on the freeway) may be executed or continued for a predetermined time interval (for example 1 minute (min), 2 min, 5 min, etc.) and/or location interval (for example every 1 kilometer (km), every 2 km, every 5 km, etc.) (depending on whether the autonomous driving mode is already being executed). In this case, the predetermined time interval and/or location interval of the continuation may be parameterized depending on the situation. By way of example, the predetermined time interval and/or location interval may be selected so as to be longer in the case of freeway journeys, and selected so as to be shorter in the case of inner city journeys, for example as it is assumed that there is less risk of a vehicle that is actually no longer authorized on freeways.

The request or authorization request 210 may accordingly comprise appropriate data 224, such as for example an identification (ID) of the vehicle 110, a position of the vehicle 110, etc. The request 210 may be a data block having a predefined length M 222 that comprises the appropriate or required data for the authorization request 224 (for example ID of the vehicle 110, position of the vehicle 110), wherein the rest of the request data block 210 may be filled with what are known as dummy bits 225 (what is known as padding). The use of data blocks having a predefinable or predefined length M 222 is conventional in the data transmission of current mobile radio systems or mobile radio networks 120 (what is known as block rounding).

After the addressed server 132 receives the request 210 via the mobile radio system or mobile radio network 120 (step 320), the server 132 is able to extract the appropriate data 224 (for example ID of the vehicle 110, position of the vehicle 110) from the request data block 210 and process them. In particular, in the processing of the request or request data block 210, the authorization of the vehicle 110 to execute the autonomous driving mode is checked (step 330). By way of example, the server 132 is able to check, by retrieving data stored in a storage unit 135A . . . 135N and/or by requesting corresponding data from one or more further application servers 137, whether:

(i) there is a security problem in relation to the vehicle 110;

(ii) the vehicle 110 is authorized by type for the intended autonomous driving mode; and/or (iii) the vehicle 110 is individually authorized for the intended autonomous driving mode.

These data may be stored, for example for all of the vehicles that have at least one at least partly autonomous driving mode, in one or more databases 135A . . . 135N, for example in accordance with an appropriate registration process using one or more accordingly appropriate registration servers (not shown).

After checking the authorization of the vehicle 110 to execute the autonomous driving mode (step 330), the server 132 may create authorization data 226 for the response or the response data block 215 (step 335). The authorization data 226 may comprise an authorization confirmation or an authorization denial. By way of example, the authorization data 226 may comprise an authorization confirmation if it has been established that:

(i) there is no security problem in relation to the vehicle 110; and/or (ii) the vehicle 110 is authorized by type for the intended autonomous driving mode; and/or (iii) the vehicle is individually authorized for the intended autonomous driving mode.

If there is a security problem and/or the vehicle 110 is not (by type or individually) authorized for the intended driving mode, the authorization data 226 comprise an authorization denial.

The processing of the request 210 by the server 132 may also comprise calculation of a payload data quantity for payload data of the response data block 215 (step 340). This payload data quantity may be the difference between the overall payload data (226+228) and the authorization data 226 of the response 215. The server 132 may then request payload data 228 for the response or the response data block 215 from one or more storage units (135A . . . 135N) or further application servers 137 (step 345), wherein the requested payload data 228 correspond to the calculated payload data quantity. The payload data 228 may for example be one or more of the following data or data types:

(i) data in relation to an update of a digital road map contained in the vehicle 110 (for example new construction sites, new road layout, etc.);

(ii) data in relation to current situations in the road traffic (for example current traffic state, current accidents, current road closures, etc.);

(iii) data in relation to current environmental influences (for example black ice, strong gusts of wind, etc.) and/or;

(iv) further appropriate data.

When the response or the response data block 215 is created by the server 132 (step 350), the corresponding data block 215 in relation to the authorization data 226 may contain the requested payload data 228. If the payload data 228 to be transmitted exceed the calculated payload data quantity, a session may be established by the server 132 and it may at the same time be noted that not all of the payload data 218 were able to be transmitted using the current response 215. In this case, the remaining payload data are sent using one or more subsequent responses 215.

The response or the response data block 215 is then transmitted to the vehicle 110 via the mobile radio network or mobile radio system 120. The vehicle 110 receives the response 215 and evaluates it accordingly (step 360). If the authorization data 226 of the response 215 comprise an authorization confirmation, the autonomous driving mode may be executed or continued (for example by the above-mentioned control unit), depending on whether the autonomous driving mode is already being executed. If the authorization data 226 by contrast comprise an authorization denial, the autonomous driving mode may be denied or interrupted depending on whether the autonomous driving mode is already being executed. If payload data 228 are also received with the response 215, these payload data may accordingly be processed in order to execute the autonomous driving mode (for example update the digital map: update current situations in the road traffic and/or update current environmental influences, etc.).

The system and method described with reference to FIGS. 1, 2 and 3 and the request response pair 205 thus advantageously allow manipulation protection with regard to the authorization of autonomous driving modes in vehicles, since an authorization of the driving modes is retrieved by each corresponding vehicle, preferably at periodic intervals. At the same time, the "filling" of the response data blocks 215 with payload data 228 (which have to be transmitted in any case to each vehicle 210 or at least each vehicle 210 having at least one at least partly autonomous driving mode via the air interface) in addition to the authorization data 226 allows optimum usage of the data blocks 215 having a predefined size M 222, which are used in the case of current mobile radio providers. In other words, the authorization data 226, which may be designed as what are known as "heartbeats", fill only a small proportion of the data blocks. By filling the data blocks with payload data 228, overloading of the mobile radio infrastructure or of the mobile radio network 120 is avoided. The commercial-based and/or technical-based quantity rounding algorithms (that is to say how large a data block 222 is) are therefore able to be optimally utilized. Since the authorization requests or requests 210 are made cyclically, the payload data 228 are able to be transmitted—if necessary—in a distributed manner through a plurality of request response pairs 205.

By virtue of combining the authorization request response pairs 205 with the payload data 228, security when performing autonomous driving modes in the vehicle 210 is increased, with a bandwidth-optimized data exchange taking place between the server 132 and corresponding vehicles 210 in relation to the mobile radio infrastructure 120 at the same time. A secure and efficient provision of autonomous driving modes is thus made possible at the same time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for secure and efficient provision of at least one at least partly autonomous driving mode of a vehicle, comprising:
   creating a request by the vehicle to retrieve an authorization to perform the at least one at least partly autonomous driving mode;
   receiving the request at a server;
   checking the authorization to perform the at least one at least partly autonomous driving mode;
   creating a response comprising authorization data corresponding to the checking and payload data that fill less than an entire predefined data block size of the response;
   calculating, by the server, a payload data quantity for the payload data of the response, wherein the payload data quantity for the payload data of the response comprises a difference between:
   an overall payload data quantity of the response, and
   a quantity of the authorization data of the response; and
   requesting the payload data for the response; and
   receiving and evaluating of the response by the vehicle, wherein
   the request comprises vehicle data,
   a quantity of the vehicle data fills only a first part of a predefined data block size of the request, and
   the overall payload data quantity of the response fills a second remaining part of the predefined data block size that is larger than the first part.

2. The method according to claim 1, wherein
   the authorization data comprises an authorization confirmation or an authorization denial, and
   the evaluation of the response by the vehicle comprises:
   if the authorization data comprise an authorization confirmation: executing or continuing the at least one at least partly autonomous driving mode by the vehicle; and
   if the authorization data comprise an authorization denial: denying or interrupting the at least one at least partly autonomous driving mode by the vehicle.

3. The method according to claim 1, wherein
   the evaluation of the response by the vehicle additionally comprises evaluating the payload data.

4. The method according to claim 3, wherein
   the payload data comprise one or more of the following data:
   (i) data in relation to an update of a digital road map contained in the vehicle;
   (ii) data in relation to current situations in the road traffic; or
   (iii) data in relation to current environmental influences.

5. The method according to claim 1, wherein
   the request is created by the vehicle upon predefinable events.

6. The method according to claim 5, wherein
   if it is not possible for the vehicle to create the request upon the predefinable events, the at least one at least partly autonomous driving mode is executed or continued by the vehicle for a predetermined time interval and/or location interval depending on the situation.

7. A system for secure and efficient provision of at least one at least partly autonomous driving mode of a vehicle, comprising:
   at least one server computing device operatively configured to:
   receive a request, created by the vehicle, to retrieve an authorization for the vehicle to perform the at least one at least partly autonomous driving mode;
   check the authorization to perform the at least one at least partly autonomous driving mode of the vehicle;

create a response comprising authorization data corresponding to the check and payload data that fill less than an entire predefined data block size of the response; and
at least one vehicle for receiving and evaluating the response, wherein
the creation of the response by the server computing device further comprises:
calculating a payload data quantity for the payload data of the response, wherein
the payload data quantity for the payload data of the response comprises a difference between:
an overall payload data quantity of the response, and
a quantity of the authorization data of the response; and
request the payload data for the response, wherein
the request comprises vehicle data,
a quantity of the vehicle data fills only a first part of a predefined data block size of the request, and
the overall payload data quantity of the response fills a second remaining part of the predefined data block size that is larger than the first part.

8. The system according to claim 7, wherein
the authorization data comprise an authorization confirmation or an authorization denial, and
the evaluation of the response by the vehicle comprises:
(i) if the authorization data comprise an authorization confirmation: executing or continuing the at least one at least partly autonomous driving mode by the vehicle; and
(ii) if the authorization data comprise an authorization denial: denying or interrupting the at least one at least partly autonomous driving mode by the vehicle.

9. The system according to claim 7, wherein
the requested payload data correspond to the calculated payload data quantity;
the evaluation of the response in the vehicle further comprises the evaluation of the payload data; and
the payload data comprises one or more of the following data:
(i) data in relation to an update of a digital road map contained in the vehicle;
(ii) data in relation to current situations in the road traffic; or
(iii) data in relation to current environmental influences.

10. The system according to claim 7, wherein
the vehicle creates the request upon predefinable events; and
if it is not possible for the vehicle to create the request upon the predefinable events, the at least one at least partly autonomous driving mode is executed or continued by the vehicle for a predetermined time interval and/or location interval depending on the situation.

11. A method for secure and efficient provision of at least one at least partly autonomous driving mode of a vehicle, comprising:

receiving, by a server, a request from the vehicle to retrieve an authorization to perform the at least one at least partly autonomous driving mode;
checking, by the server, the authorization to perform the at least one at least partly autonomously driving mode;
creating, by the server, a response comprising authorization data corresponding to the checking and payload data that fill less than an entire predefined data block size of the response;
calculating, by the server, a payload data quantity for the payload data of the response, wherein
the payload data quantity for the payload data of the response comprises a difference between:
an overall payload data quantity of the response, and
a quantity of the authorization data of the response;
requesting payload data for the response; and
transmitting the response to the vehicle for evaluation, wherein
the request comprises vehicle data,
a quantity of the vehicle data fills only a first part of a predefined data block size of the request, and
the overall payload data quantity of the response fills a second remaining part of the predefined data block size that is larger than the first part.

12. The method according to claim 11, wherein
the requested payload data correspond to the calculated payload data quantity; and the evaluation of the response in the vehicle additionally comprises the evaluation of the payload data.

13. The method according to claim 12, wherein the payload data comprise one or more of the following data:
(i) data in relation to an update of a digital road map contained in the vehicle;
(ii) data in relation to current situations in the road traffic; or
(iii) data in relation to current environmental influences.

14. The method according to claim 1, wherein
the request and the response comprise data blocks having a predefined matching data block size.

15. The method according to claim 14, wherein the vehicle data comprises one or more of:
identification data of the vehicle; or position data of the vehicle, wherein the overall payload data quantity of the response comprises a difference between the vehicle data and the predefined matching data block size.

16. The method according to claim 1, wherein the predefined data block size of the request or the predefined data block size of the response comprises the overall payload data quantity of the response and a quantity of the vehicle data of the request.

17. The method according to claim 16, wherein
the overall payload data quantity of the response is greater than the vehicle data of the request.

* * * * *